United States Patent [19]

Spörer

[11] Patent Number: 5,235,596
[45] Date of Patent: Aug. 10, 1993

[54] CIRCUIT ARRANGEMENT FOR GENERATING SYNCHRONIZATION SIGNALS IN A TRANSMISSION OF DATA

[75] Inventor: Gerhard Spörer, Kleinensee, Fed. Rep. of Germany

[73] Assignee: Siemens Aktiengesellschaft, Munich, Fed. Rep. of Germany

[21] Appl. No.: 721,612

[22] PCT Filed: Apr. 20, 1990

[86] PCT No.: PCT/DE90/00295
  § 371 Date: Jul. 16, 1991
  § 102(e) Date: Jul. 16, 1991

[87] PCT Pub. No.: WO90/13191
  PCT Pub. Date: Nov. 1, 1990

[30] Foreign Application Priority Data

Apr. 27, 1989 [DE] Fed. Rep. of Germany ....... 3914006

[51] Int. Cl.$^5$ ............................................. H04J 3/06
[52] U.S. Cl. ................................. 370/100.1; 370/106
[58] Field of Search ................. 370/100.1, 103, 105.4; 375/106, 108, 114, 116; 371/37.1, 42, 46; 360/32, 51

[56] References Cited

U.S. PATENT DOCUMENTS

| | | | |
|---|---|---|---|
| 3,363,183 | 1/1968 | Bowling et al. | 328/63 |
| 3,983,498 | 9/1976 | Malek | 328/155 |
| 4,031,316 | 6/1977 | Reisinger et al. | 370/41 |
| 4,517,681 | 5/1985 | Mantellina et al. | 375/106 |
| 4,771,441 | 9/1988 | Spengler et al. | 375/106 |
| 5,042,053 | 8/1991 | Hoppes | 375/106 |
| 5,052,026 | 9/1991 | Walley | 375/116 |

FOREIGN PATENT DOCUMENTS

0262609A2 4/1988 European Pat. Off. .
0275406A1 7/1988 European Pat. Off. .
3234576A1 3/1984 Fed. Rep. of Germany .

Primary Examiner—Douglas W. Olms
Assistant Examiner—Shick Hom
Attorney, Agent, or Firm—Hill, Steadman & Simpson

[57] ABSTRACT

In a transmission of data upon employment of binarily coded data signals (D), reception clocks (ET) with which the data signals (D) are sampled in their middles are generated for the recovery of the transmitted data. The reception clocks (ET) are thereby synchronized phase-wise by the synchronization signals (SY) generated from the data signals (D). In order to also be able to sample the data signals (D) in their middles insofar as possible given distortions of the data signals (D) up to 50%, the synchronization signals (SY) are inventively generated taking the respective distortion into consideration. To this end, a counter (Z) is provided that is respectively counted from an initial value up to a final value by high-frequency clock pulses (T3). Given changes of the binary value of the data signals (D), a synchronization unit (SYS) sets the counter (Z) to its initial value. The counter (Z) is preceded by a switch unit (SS) that always through-connects clock pulses (T1) having a higher repetition rate whenever the counter (Z) has not yet reached its final value at the end of a data signal (D). An output unit (AS) always outputs a synchronization signal (SY) when the counter (Z) reaches its final value. The invention can be particularly employed in a transmission of data wherein the reception clocks allocated to the data signals are generated at the receiver side.

10 Claims, 3 Drawing Sheets

CIRCUIT ARRANGEMENT FOR GENERATING SYNCHRONIZATION SIGNALS IN A TRANSMISSION OF DATA

BACKGROUND OF THE INVENTION

The invention is directed to a circuit arrangement for generating synchronization signals in a transmission of data from a transmission unit to a reception unit, whereby the data are transmitted by binarily coded data signals that are sampled by reception clocks for the recovery of the transmitted data and whereby the reception clocks are synchronized phase-wise by synchronization signals allocated to the data signals upon employment of a counter that is respectively counted from an initial value up to a final value by clock pulses whose repetition rate is significantly higher than the repetition rates of the data signals.

It is notoriously known to transmit data with binary data signals from a transmission unit to a reception unit without accompanying clock pulses. In such a transmission, a clock control is provided in the reception unit, this clock control generating reception clocks from the received data signals and supplying them to a sampling unit. The reception clocks therein sample the data signals and recover the transmitted data from the data signals. To this end, the data signals should be respectively sampled in their middle insofar as possible.

Such a reception unit of the prior art is shown in FIG. 1 in the form of a block circuit diagram and its functioning shall be explained in greater detail together with the time diagrams shown in FIG. 2, the time t being shown therein in abscissa direction and the momentary values of signals being shown therein in ordinate direction.

Given the reception unit shown as a block circuit diagram in FIG. 1, the binarily coded data signals D are supplied, first, to a pulse generator IG and, second, to the sampling unit AB that recovers the transmitted data from the data signals D upon employment of reception clock ET and makes them available for a further processing as received data ED. The reception clock ET is generated in a clock control TS. For synchronizing the reception clock ET with the data signals D, the pulse generator IG generates synchronization signals SY. These synchronization signals SY are adjacent at the clock control TS and the latter sets the phase relation of the reception clock ET such that the reception clock ET always samples the data signals D in its middles insofar as possible.

The data signals D shown in FIG. 2 are undistorted data signals, i.e. they change their binary values at whole multiples of prescribed time intervals. At points in time at the trailing edges of the data signals D that respectively correspond to one another, the pulse generator IG generates the synchronization signals SY with which the phase relation of the reception clock ET generated in the clock control TS is set such that the data signals D are sampled in its middles at times t1 through t5 by the leading edges of the reception clock ET in order to recover the received data ED.

The data signals can be subject to distortions in the transmission of the data, for example via a radio link affected with interference. When the reception clocks are derived from these data signals, the data signals cannot be reliably sampled since the reception clocks are only synchronized by the edges of the data signals.

SUMMARY OF THE INVENTION

It is therefore the object of the invention to specify a circuit arrangement for generating synchronization signals, the data signals also being sampled with great reliability given the employment thereof even when they are subject to distortions.

In a circuit arrangement of the species initially cited, this object is inventively achieved by the circuit arrangement wherein: the counter can be respectively counted from a constant initial value up to a constant final value; a synchronization unit is provided at which the data signals are received generating a load signal given every change of the binary value of the data signals from a first binary value to a second binary value, the load signal setting the counter to its initial value and generating switch-over signals at every change of the binary values of the data signals; the counter is preceded by a switch unit at which the switch-over signals are received, said switch unit always through-connecting first clock pulses having a higher repetition rate to the counter when a data signal has the first binary value and always through-connecting second clock pulses having a lower repetition rate to the counter whenever a data signal has the second binary value; and an output unit is provided that always outputs a synchronization signal when the counter has reached its final value.

A particular feature of the invention is comprised therein that the distortions of the data signals are taken into consideration in the generation of the synchronization signals.

The invention makes it possible to also reliably sample data signals having distortions of up to 50% of their pulse duration; the circuit arrangement nonetheless requires only little outlay and can be manufactured as an integrated circuit.

Advantageous developments of the invention include the following. The switch unit inhibits the counter after the appearance of every synchronization signal. The repetition rate of the first clock pulses is twice as high as the repetition rate of the second clock pulses. The synchronization unit generates an enable signal and outputs it to the output unit and only enables the output of the synchronization signals there when the data signal has the first binary value. An enable unit is provided that outputs an enable signal to the synchronization unit when a prescribed counter reading of the counter that is lower than the final value is reached, the enable signal enabling the generation of a synchronization signal. The enable unit contains a flip-flop that is set by a counter signal allocated to the prescribed counter reading and is reset by the load signal and at whose inverting output the enable signal is output. An inhibit unit is provided that outputs an inhibit signal to the synchronization unit when the counter transgresses a prescribed counter reading, the plurality of the data signals being inverted at synchronization unit with the inhibit signal and an inhibit signal being generated with which the clock pulses are inhibited in the switch unit. The synchronization unit contains an exclusive-OR element having one input that receives the data signals and another input that receives an output signal of a flip-flop, this flip-flop being switched into a respectively opposite position by the inhibit signal. The synchronization unit contains a flip-flop with which the data signals can be synchronized with the clock pulses. The counter can be respectively counted down from the prescribed initial value to the prescribed final value. An output signal of the counter supplied to the output unit is allocated to an overflow signal of the counter.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures in which like reference numerals identify like elements, and in which:

DESCRIPTION OF THE PREFERRED EMBODIMENT

Figure 1:
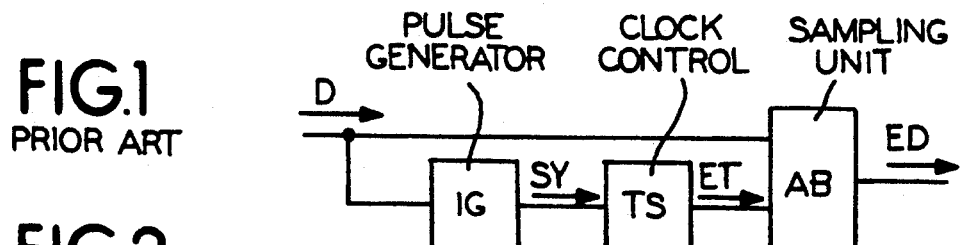
FIG. 1 is a block circuit diagram of a reception unit for transmitted data signals.
Figure 2:
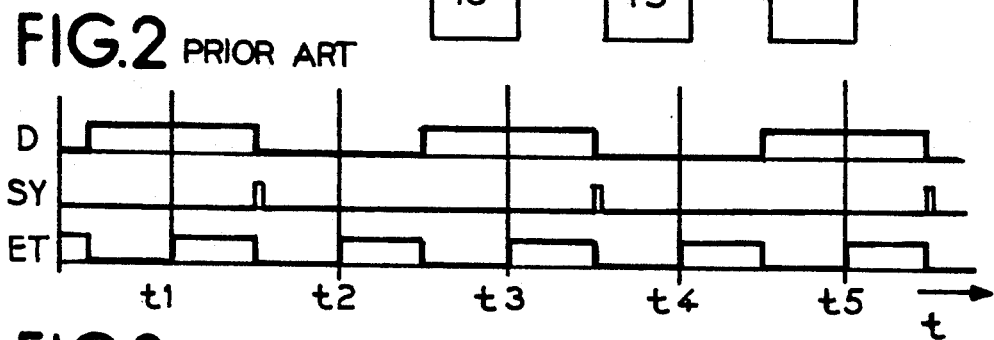
FIG. 2 depicts time diagrams of signals given the reception of undistorted data signals.
Figure 3:
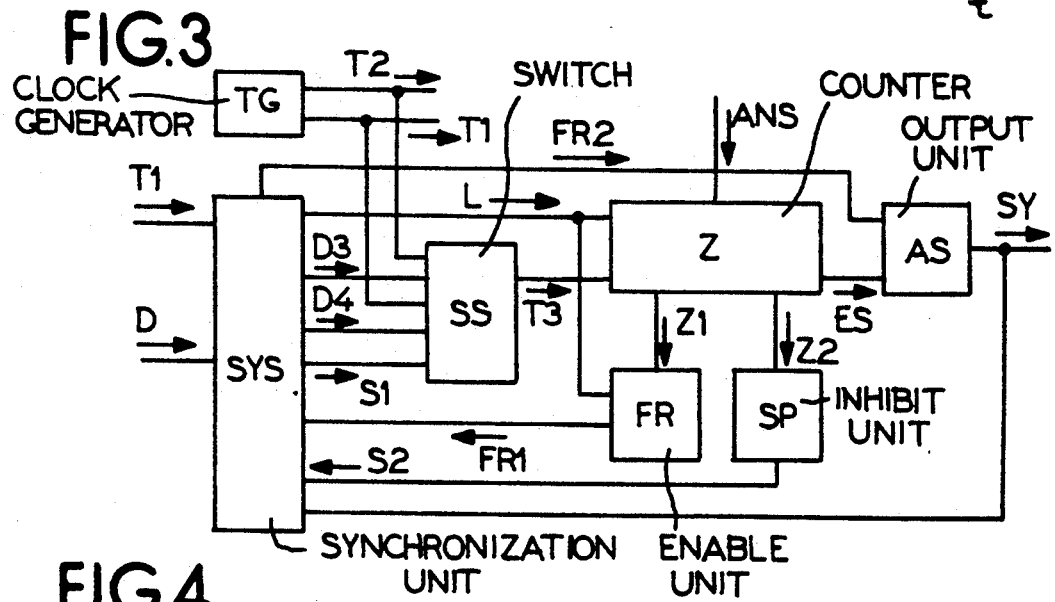
FIG. 3 is a block circuit diagram of a circuit arrangement of the invention.

Given the circuit arrangement shown in FIG. 3 that can be employed as a pulse generator IG in accord with FIG. 1, a clock generator TG generates clock pulses T1 and T2. The clock pulses T2 have half the repetition rate of the clock pulses T1 and are generated from the latter by frequency division, for example with a flip-flop. The clock pulses T1 and T2 are supplied to the various components of the circuit arrangement, whereby only the delivery thereof to a switch unit SS is shown. The repetition rate of the clock pulses T1, for example, is equal to 128 times the nominal repetition rate of the data signals D.

Further details of the circuit arrangement shall be set forth in greater detail below in conjunction with the time diagrams shown in FIG. 4, wherein the time t is shown in abscissa direction and the momentary values of signals as well as counter readings ZS of a counter Z are analogously shown in ordinate direction.

The data signals D pend at a synchronization unit SYS wherein they are synchronized with the clock pulses T1. When a data signal D assumes the binary value 1, the synchronization unit SYS generates a load pulse L that sets the counter Z to an initial value AN, for example 64, with initial value signals ANS and resets an enable unit FR and also cancels an inhibit signal S1 for the switch unit SS via the synchronization unit SYS. The synchronization unit SYS also generates a switch-over signal D3 for the data pulses T1 and T2, a data signal that through-connects the clock pulses T2 via the switch unit SS to the counter Z as clock pulses T3. The clock pulses T3 drive the counter Z and deincrement it down to a final value EN, for example zero. As soon as it reaches a counter reading 32 that corresponds to half the initial value AN, it outputs a signal Z1 that sets the enable unit FR and initiates it to generate an enable signal FR1 since the data signal D then comprises a pulse duration of at least 50% of the rated duration in the undistorted case. Otherwise, the inhibit signal S1 would immediately inhibit the output of the clock pulses T3 and the counting would thus be terminated.

When the data signals D are undistorted, the corresponding data signal D is sampled precisely in its middle at time t1 by the reception clock ET and the counter Z reaches the final value EN having the value zero exactly when the data signal D changes its binary value from 1 to 0. In this case, it outputs a final value signal ES to an output unit AS. With the change of the binary value, the synchronization unit SYS also outputs an enable signal FR2 to the output unit AS and the latter generates a synchronization signal SY that serves the purpose of setting the phase relation of the reception clock ET. Further, the synchronization signal SY also results in the generation of the inhibit signal S1 with which the switch unit SS is inhibited and with which the counting is terminated. At time t2, the data signal D is again sampled in its middle by a reception clock ET. After the next change in the binary value of the data signal D, a similar procedure then repeats and the data signal D is again sampled at time t3.

When the data signal D is distorted and already changes its binary value from 1 to 0 at time t4 before the counter Z has reached its final value EN, the synchronization unit SYS forwards the data signal D4 to the switch unit SS as switch-over signal and this switch unit SS now through-connects the clock pulses T1 to the counter Z with the higher repetition rate, so that this reaches its final value En faster and the synchronization signal SY is output correspondingly earlier at time t5. The phase relation of the reception clock ET is thus again set, so that the corresponding data signal D is sampled closer toward its middle at time t6. Events similar to those between times t2 and t5 then repeat between times t6 and t9 and the corresponding data signal D is again sampled closer to its middle at time t7 than would be the case without the switching of the clock pulses T1 and T2.

When a data signal D lasts longer than the rated duration in the undistorted case, the counter Z generates a counting signal. This counting signal Z2 is adjacent at an inhibit unit SP that then generates an inhibit signal ST with which the switch unit SS is likewise inhibited by the inhibit signal S1 via the synchronization unit SY. The synchronization unit SYS is also inhibited and the polarity of the data signals D is inverted since these are not allowed to have any rated duration that is greater than 103%. Events corresponding to those given the other changes then repeat given the next change of the binary value of the data signal D.

Instead of being counted down, the counter Z can also be counted up. In this case, for example, the initial value signal ANS always sets it to the initial value AN of zero and the clock pulses T3 then increment it to a final value EN of 64.

Figure 4:
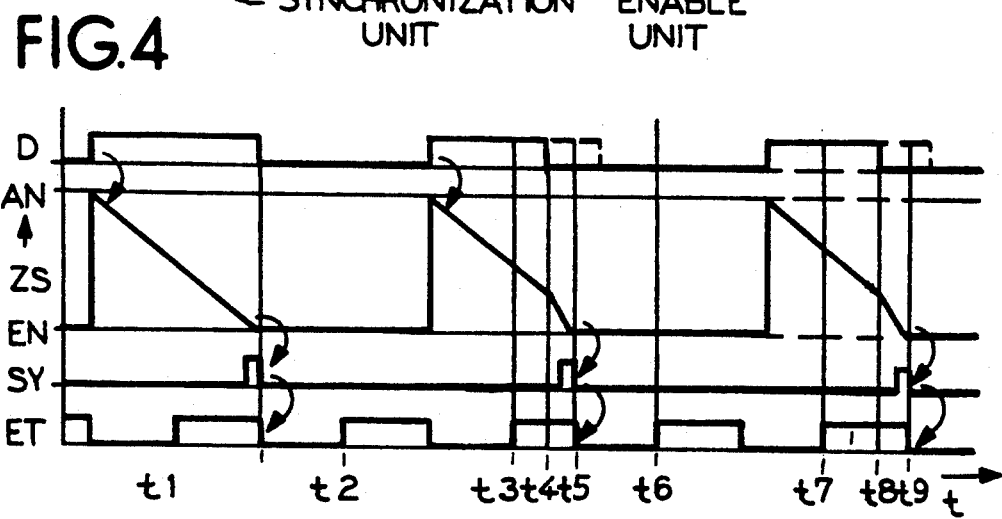
FIG. 4 depicts time diagrams of signals given a reception of distorted data signals.

In the illustration of FIG. 4, the data signals D are shortened by up to 50% due to distortions. The corresponding, undistorted data signals D are shown in broken lines. As a consequence of the distorted data signals D, the synchronization signals SY are not always generated at the edges thereof but by the counter Z that is respectively counted from the prescribed initial value AN to the prescribed final value EN. The synchronization signal SY with which the reception clock ET is synchronized is generated every time the final value EN is reached. At the end of every data signal D having trailing edges, a switch is undertaken from the clock pulses T2 having low repetition rate to the clock pulses T1 having high repetition rate, so that the final value EN is reached faster and the reception clock ET can be synchronized leading. At time t4 and t8, a switch is respectively undertaken to the clock pulses T1 having the higher repetition rate and the leading synchronization signals SY are generated at times t5 and t9.

The circuit diagram shown in FIG. 5 for the circuit arrangement shall be set forth in greater detail below together with the time diagrams shown in FIG. 6, wherein the time t is shown in abscissa direction and the momentary values of signals as well as the counter readings ZS of the counter Z are analogously shown in ordinate direction.

Figure 5:
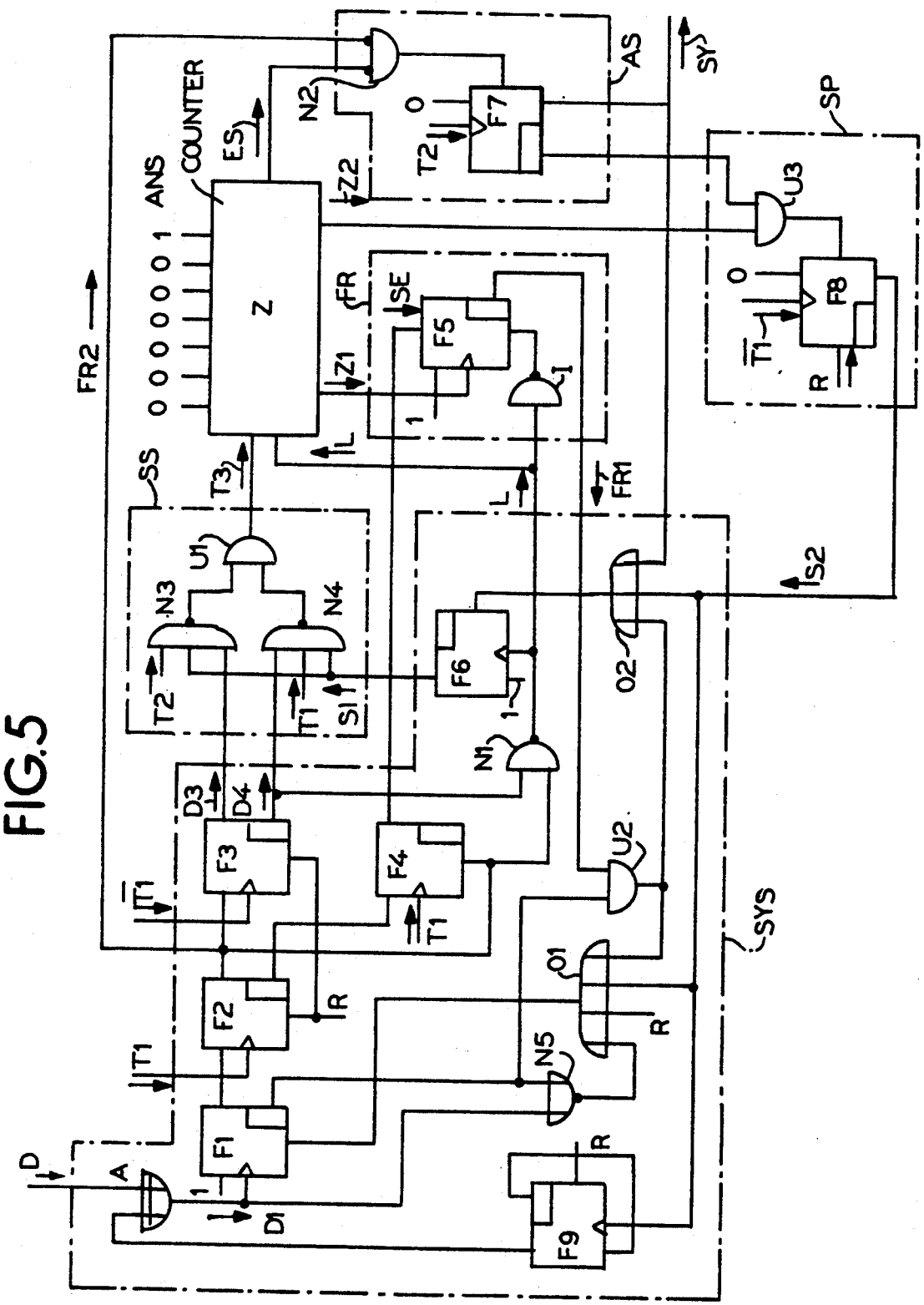
FIG. 5 is a circuit diagram of a circuit arrangement of the invention.
Figure 6:
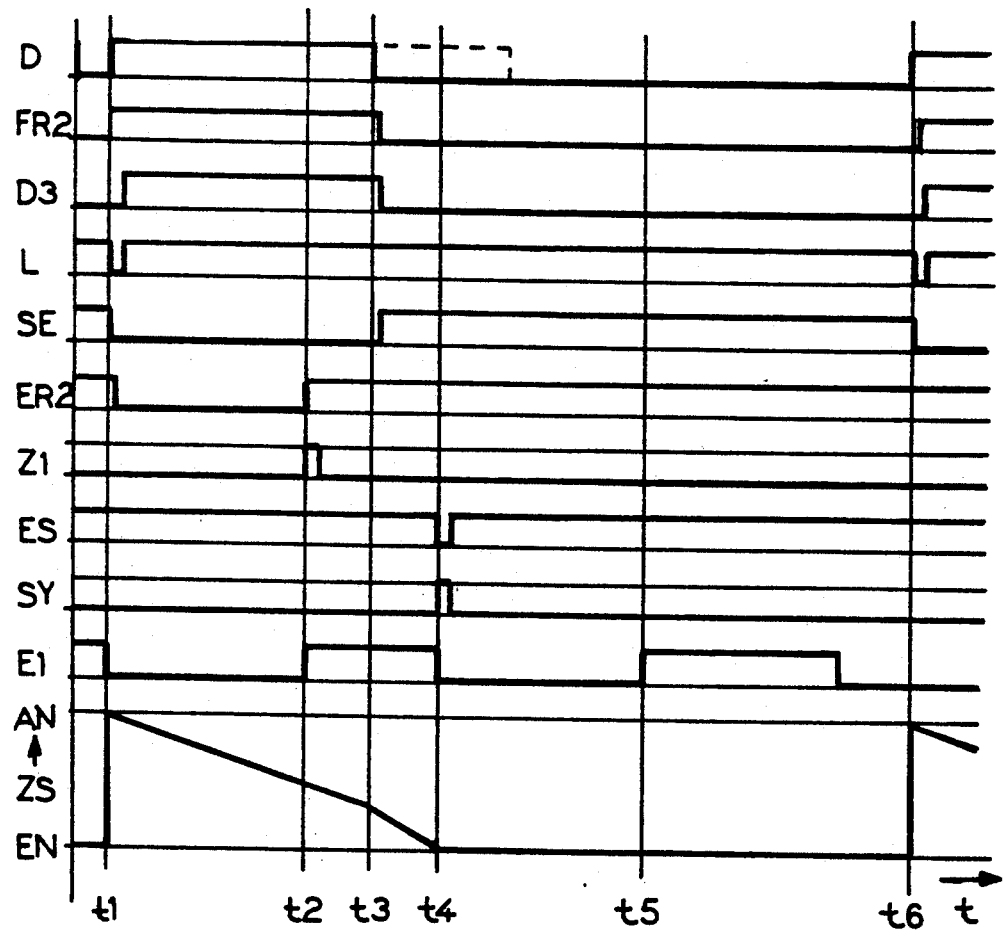
FIG. 6 depicts time diagrams of signals at various points of the circuit arrangement.

A clock generator TG is provided for the circuit diagram shown in FIG. 5 of the circuit arrangement, this clock generator TG generating clock pulses T1, $\overline{T1}$ and T2, whereby the clock pulses T1 have twice the repetition rate of the clock pulses T2 and the clock pulses $\overline{T1}$ correspond to the inverted clock pulses T1. The repetition rate of the clock pulses T1, for example, is equal to 128 times the repetition rate of the undistorted data signals D.

At the beginning, the circuit arrangement is reset by a reset signal R that is adjacent at the components in the illustrated way and resets flip-flops F1 through F3, F8 and F9. The data signals D are adjacent at an input of an exclusive-OR element A given the employment whereof the polarity of the data signals D can be inverted as warranted. The exclusive-OR element A outputs the data signal D1 at its output, this data signal D1 being adjacent at the clock input of the flip-flop F1 at whose data input the binary value 1 is adjacent. When the binary value of the data signal D changes, for example, from 0 to 1 at time t1, the binary value of the data signal D1 at the output of the exclusive-OR element A likewise changes from 0 to 1 and the flip-flop F1 is set, given the condition that the flip-flop F9 is reset. The output of the flip-flop F1 is connected to the data input of the flip-flop F2 at whose clock input the clock pulses T1 are adjacent and that, together with the flip-flop F3, serves the purpose of synchronization of the data signals D or, respectively, D1 with the clock pulses T1 and $\overline{T1}$. The flip-flop F2 is set with the next clock pulses T1.

The non-inverting output of the flip-flop F2 is connected to an input of an NOR element N2, to the data input of the flip-flop F3, to the reset input of a flip-flop F4 and to a first input of an NAND element N1 whose second input is connected to the inverting output of the flip-flop F3. Since the flip-flop F3 is reset, the NAND element N1 outputs the load pulse L having the binary value 0 that, due to the initial value signals ANS having the binary values 1000000, loads the value 64 into the counter Z and resets a flip-flop F5 via an inverter I. The enable signal FR1 at the inverting output of the flip-flop F5 enables an AND element U2.

The inverting output of the flip-flop F2 is connected to the data input of the flip-flop F4 at whose clock input the clock pulses T1 are adjacent. The flip-flop F4 has already been reset, so that no change in the status of the flip-flop F4 ensues with the next clock pulse T1.

The clock pulses $\overline{T1}$ are adjacent at the clock input of the flip-flop F3 and this flip-flop F3 is also set with the next clock pulse $\overline{T1}$. The load pulse L thus again assumes the binary value 1 and it sets a further flip-flop F6 that enables two NAND elements N3 and N4 with an inhibit signal S1. These NAND elements N3 and N4 are respectively connected to an output of the flip-flop F3 and the data signals D3 and D4, on the one hand, are adjacent thereat as switch-over signals and, second, the clock pulses T1 or, respectively, T2 are also adjacent thereat. Since the flip-flop F3 is set, inverted clock pulses T2 are output via the NAND element N3 and are supplied to the counter Z as clock pulses T3 via an AND element U1. The counter Z thus begins to count down from its initial value 64 to its final value.

As soon as the counter Z has reached its counter reading 32 at time t2, it outputs a corresponding counter signal Z1 that is adjacent at the data input of the flip-flop F5 and sets it. The enable signal FR1 at the inverting output of this flip-flop F5 now inhibits the AND element U2. The flip-flop F5 essentially forms the enable unit FR and it only enables the circuit arrangement when the data are respectively longer than 50% of their rated duration. Otherwise, the AND element U2 would generate a reset signal that inhibits the switch unit SS.

At time t3, the data signal D again assumes the binary value 0 and the data signal D1 thus also assumes the binary value 0. The flip-flop F1 is reset via an NOR element N5 at whose first input the data signal D1 is adjacent and whose second input is connected to the inverting output of the flip-flop F1 and is also reset via an OR element O1. The flip-flop F2 is also reset with the next clock pulse T1. In a corresponding way, the next clock pulse $\overline{T1}$ resets the flip-flop F3. The next clock pulse T1 sets the flip-flop F4 and this in turn holds the flip-flop F5 in the set condition on the basis of a set signal SE.

The NAND element N3 is inhibited and the NAND element N4 is enabled with the resetting of the flip-flop F3. Due to the data signal D4, this now through-connects the clock pulses T1 having twice the frequency to the counter Z, so that this reaches its final value 0 faster.

As soon as the counter Z has reached its final value 0, it outputs an overflow signal having the binary value 0 as final value signal ES at its output at time t4, this overflow signal setting a flip-flop F7 via the NOR element N2. The flip-flop F7 outputs the synchronization SY at its output.

Via an OR element O2, the synchronization signal SY resets the flip-flop F6 that in turn inhibits the NAND elements N3 and N4 with the inhibit signal S1 and prevents a further counting of the counter Z. The flip-flop F7 is again reset with the next clock pulse T2 and the synchronization signal SY is thus ended in turn. The synchronization signal SY resets the phase of the reception clock ET and the data signal D is again sampled at time t5. An event similar to that following time t1 repeats after time t6. If the binary value of the data signal D changes too late and the counter Z has previously reached its final value and outputs the final value ES, the NOR element N2 does not output a setting signal to the flip-flop F7 since the flip-flop F2 is set and the NOR element N2 is consequently inhibited.

In case the counter Z has reached a counter reading that is allocated to a distortion of the data signal D by more than 100% before the change of the binary value of the data signal D from 1 to 0, it outputs a counter signal Z2 via an AND element U3 to a flip-flop F8 that sets the latter and outputs an inhibit signal S2 at its output. This inhibit signal S2 likewise resets the flip-flop F6 and prevents the output of further clock pulses T1 or T2 to the counter Z. It also resets the flip-flop F1 and sets a flip-flop F9 whose output is connected to the exclusive OR element A. The exclusive OR element A now inverts the data signal D and an event similar to that between times t1 and t2 repeats with the next change of the binary value of the data signal D at time t6.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A circuit arrangement for generating synchronization signals in a transmission of data from a transmission unit to a reception unit, the data being transmitted by binarily coded data signals that are sampled by reception clocks for the recovery of the transmitted data and the reception clocks being phase synchronized by synchronization signals allocated to the data signals upon employment of a counter that is respectively counted from an initial value to a final value by clock pulses whose repetition rate is significantly higher than repetition rates of the data signals, comprising: the counter being respectively counted from a constant initial value to a constant final value; a synchronization unit receiving the data signals, and generating a load signal given every change of a binary value of the data signals from a first binary value to a second binary value, said load signal being received by the counter and setting the counter to its initial value, and the synchronization unit also generating switch-over signals for every change of the binary values of the data signals; the counter preceded by a switch unit which receives the switch-over signals, said switch unit always through-connecting first clock pulses of the reception clocks having a higher repetition rate to the counter when a data signal has the first binary value and always through-connecting second clock pulses of the reception clocks having a lower repetition rate to the counter whenever a data signal has the second binary value; and an output unit connected to an output of the counter that always outputs a synchronization signal when the counter has reached its final value.

2. The circuit arrangement according to claim 1, wherein the switch unit inhibits the counter after the appearance of every synchronization signal.

3. The circuit arrangement according to claim 1, wherein the repetition rate of the first clock pulses is twice as high as the repetition rate of the second clock pulses.

4. The circuit arrangement according to claim 1, wherein the synchronization unit generates an enable signal and outputs the enable signal to the output unit and the output unit thereby only outputting the synchronization signals when the data signal has the first binary value.

5. The circuit arrangement according to claim 1, wherein the circuit arrangement further comprises an enable unit that outputs an enable signal to the synchronization unit when a prescribed counter reading of the counter that is before than the final value is reached, said enable signal enabling the generation of the synchronization signal.

6. The circuit arrangement according to claim 5, wherein the enable unit contains a flip-flop that is set by a counter signal from the counter allocated to the prescribed counter reading and is reset by the load signal and the enable unit having an inverting output on which the enable signal is output.

7. The circuit arrangement according to claim 1, wherein the circuit arrangement further comprises an inhibit unit that outputs an external inhibit signal to the synchronization unit when the counter transgresses a prescribed counter reading, a plurality of the data signals being inverted at said synchronization unit with said external inhibit signal and an internal inhibit signal generated by said synchronization unit with which the clock pulses are inhibited in the switch unit.

8. The circuit arrangement according to claim 7, wherein the synchronization unit contains an exclusive-OR element having one input that receives the data signals and having another input that receives an output signal of a flip-flop, the flip-flop being switched into a respectively opposite position by the external inhibit signal.

9. The circuit arrangement according to claim 1, wherein the synchronization unit contains a flip-flop with which the data signals can be synchronized with the clock pulses.

10. The circuit arrangement according to claim 1, wherein an output signal of the counter supplied to the output unit is allocated to an overflow signal of the counter.

* * * * *